(12) United States Patent
Faubel et al.

(10) Patent No.: US 10,650,806 B2
(45) Date of Patent: May 12, 2020

(54) SYSTEM AND METHOD FOR DISCRIMINATIVE TRAINING OF REGRESSION DEEP NEURAL NETWORKS

(71) Applicant: Cerence Operating Company, Burlington, MA (US)

(72) Inventors: Friedrich Faubel, Ulm (DE); Jonas Sautter, Ulm (DE)

(73) Assignee: Cerence Operating Company, Burlington, MA (US)

( * ) Notice: Subject to any disclaimer, the term of this patent is extended or adjusted under 35 U.S.C. 154(b) by 47 days.

(21) Appl. No.: 15/959,606

(22) Filed: Apr. 23, 2018

(65) Prior Publication Data
US 2019/0325860 A1    Oct. 24, 2019

(51) Int. Cl.
| | |
|---|---|
| *G10L 15/16* | (2006.01) |
| *G10L 15/06* | (2013.01) |
| *G10L 25/18* | (2013.01) |
| *G10L 25/21* | (2013.01) |
| *G06N 3/08* | (2006.01) |
| *G10L 15/02* | (2006.01) |

(52) U.S. Cl.
CPC .............. *G10L 15/16* (2013.01); *G06N 3/08* (2013.01); *G10L 15/02* (2013.01); *G10L 15/063* (2013.01); *G10L 25/18* (2013.01); *G10L 25/21* (2013.01); *G10L 2015/025* (2013.01)

(58) Field of Classification Search
CPC . G10L 15/16; G10L 15/02; G10L 5/00; G10L 15/063; G10L 25/18; G10L 25/21; G06N 20/00; G06N 3/08
See application file for complete search history.

(56) References Cited

U.S. PATENT DOCUMENTS

| | | | | |
|---|---|---|---|---|
| 5,581,659 | A * | 12/1996 | Takatori .................. | G06N 3/08 706/19 |
| 2001/0044789 | A1* | 11/2001 | Widrow ................. | G06N 3/061 706/14 |
| 2008/0158096 | A1* | 7/2008 | Breed .................... | B60N 2/002 345/7 |
| 2008/0276191 | A1* | 11/2008 | Breed .................... | B60N 2/002 715/771 |
| 2009/0287624 | A1 | 11/2009 | Rouat et al. | |

(Continued)

OTHER PUBLICATIONS

International Search Report dated Jul. 17, 2019 from corresponding International Patent Application No. PCT/US2019/028742, 3 pages.

(Continued)

*Primary Examiner* — Mohammad K Islam
(74) *Attorney, Agent, or Firm* — Occhiuti & Rohlicek LLP

(57) ABSTRACT

A method, computer program product, and computer system for transforming, by a computing device, a speech signal into a speech signal representation. A regression deep neural network may be trained with a cost function to minimize a mean squared error between actual values of the speech signal representation and estimated values of the speech signal representation, wherein the cost function may include one or more discriminative terms. Bandwidth of the speech signal may be extended by extending the speech signal representation of the speech signal using the regression deep neural network trained with the cost function that includes the one or more discriminative terms.

11 Claims, 13 Drawing Sheets

(56) References Cited

U.S. PATENT DOCUMENTS

2014/0342324 A1   11/2014  Ghovanloo et al.
2015/0332702 A1   11/2015  Disch et al.
2017/0162194 A1*  6/2017  Nesta ..................... G10L 25/30

OTHER PUBLICATIONS

Written Opinion dated Jul. 17, 2019 from corresponding International Patent Application No. PCT/US2019/028742, 7 pages.

* cited by examiner

SYSTEM AND METHOD FOR DISCRIMINATIVE TRAINING OF REGRESSION DEEP NEURAL NETWORKS

BACKGROUND

Generally, due to telephony networks, such as Universal Mobile Telecommunications System (UMTS) and Long-Term Evolution (LTE) networks, being expanded into urban areas, users are increasingly more accustomed to high-quality wideband (e.g., 16 kHz) telephony. Coverage tends to be low for locations such as remote highways or rural areas in the countryside. Typically, once the UMTS/LTE connection is lost, the voice quality may be suddenly reduced to narrow-band (e.g., 8 kHz), which may be quite noticeable. Bandwidth extension may be used to bridge the arising voice quality gap by artificially extending the narrow-band (e.g., 8 kHz) telephone signal to a wideband (e.g., 16 kHz), super-wideband (e.g., 24 kHz) or even full-band (e.g., 32/48 kHz) signal.

BRIEF SUMMARY OF DISCLOSURE

In one example implementation, a method, performed by one or more computing devices, may include but is not limited to transforming, by a computing device, a speech signal into a speech signal representation. A regression deep neural network may be trained with a cost function to minimize a mean squared error between actual values of the speech signal representation and estimated values of the speech signal representation, wherein the cost function may include one or more discriminative terms. The bandwidth of the speech signal may be extended by extending the speech signal representation of the speech signal using the regression deep neural network trained with the cost function that includes the one or more discriminative terms.

One or more of the following example features may be included. The speech signal representation may be obtained by decomposing the speech signal into a spectral envelope and an excitation signal, and wherein the spectral envelope may be extended using the regression deep neural network trained with the cost function. The one or more discriminative terms may include at least one of a fricative-to-vowel power ratio and a function thereof. The one or more discriminative terms may preserve relations of statistics between different phoneme classes in the actual values of the speech signal representation and the estimated values of the speech signal representation. The cost function may preserve a power ratio between the different phoneme classes in the actual values of the speech signal representation and the estimated values of the speech signal representation. The cost function may preserve the power ratio between the different phoneme classes using a weighted sum of K power ratio errors between the different phoneme classes. An average power ratio may be reproduced at an output of the regression deep neural network.

In another example implementation, a computing system may include one or more processors and one or more memories configured to perform operations that may include but are not limited to transforming a speech signal into a speech signal representation. A regression deep neural network may be trained with a cost function to minimize a mean squared error between actual values of the speech signal representation and estimated values of the speech signal representation, wherein the cost function may include one or more discriminative terms. The bandwidth of the speech signal may be extended by extending the speech signal representation of the speech signal using the regression deep neural network trained with the cost function that includes the one or more discriminative terms.

One or more of the following example features may be included. The speech signal representation may be obtained by decomposing the speech signal into a spectral envelope and an excitation signal, and wherein the spectral envelope may be extended using the regression deep neural network trained with the cost function. The one or more discriminative terms may include at least one of a fricative-to-vowel power ratio and a function thereof. The one or more discriminative terms may preserve relations of statistics between different phoneme classes in the actual values of the speech signal representation and the estimated values of the speech signal representation. The cost function may preserve a power ratio between the different phoneme classes in the actual values of the speech signal representation and the estimated values of the speech signal representation. The cost function may preserve the power ratio between the different phoneme classes using a weighted sum of K power ratio errors between the different phoneme classes. An average power ratio may be reproduced at an output of the regression deep neural network.

In another example implementation, a computer program product may reside on a computer readable storage medium having a plurality of instructions stored thereon which, when executed across one or more processors, may cause at least a portion of the one or more processors to perform operations that may include but are not limited to transforming a speech signal into a speech signal representation. A regression deep neural network may be trained with a cost function to minimize a mean squared error between actual values of the speech signal representation and estimated values of the speech signal representation, wherein the cost function may include one or more discriminative terms. The bandwidth of the speech signal may be extended by extending the speech signal representation of the speech signal using the regression deep neural network trained with the cost function that includes the one or more discriminative terms.

One or more of the following example features may be included. The speech signal representation may be obtained by decomposing the speech signal into a spectral envelope and an excitation signal, and wherein the spectral envelope may be extended using the regression deep neural network trained with the cost function. The one or more discriminative terms may include at least one of a fricative-to-vowel power ratio and a function thereof. The one or more discriminative terms may preserve relations of statistics between different phoneme classes in the actual values of the speech signal representation and the estimated values of the speech signal representation. The cost function may preserve a power ratio between the different phoneme classes in the actual values of the speech signal representation and the estimated values of the speech signal representation. The cost function may preserve the power ratio between the different phoneme classes using a weighted sum of K power ratio errors between the different phoneme classes. An average power ratio may be reproduced at an output of the regression deep neural network.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
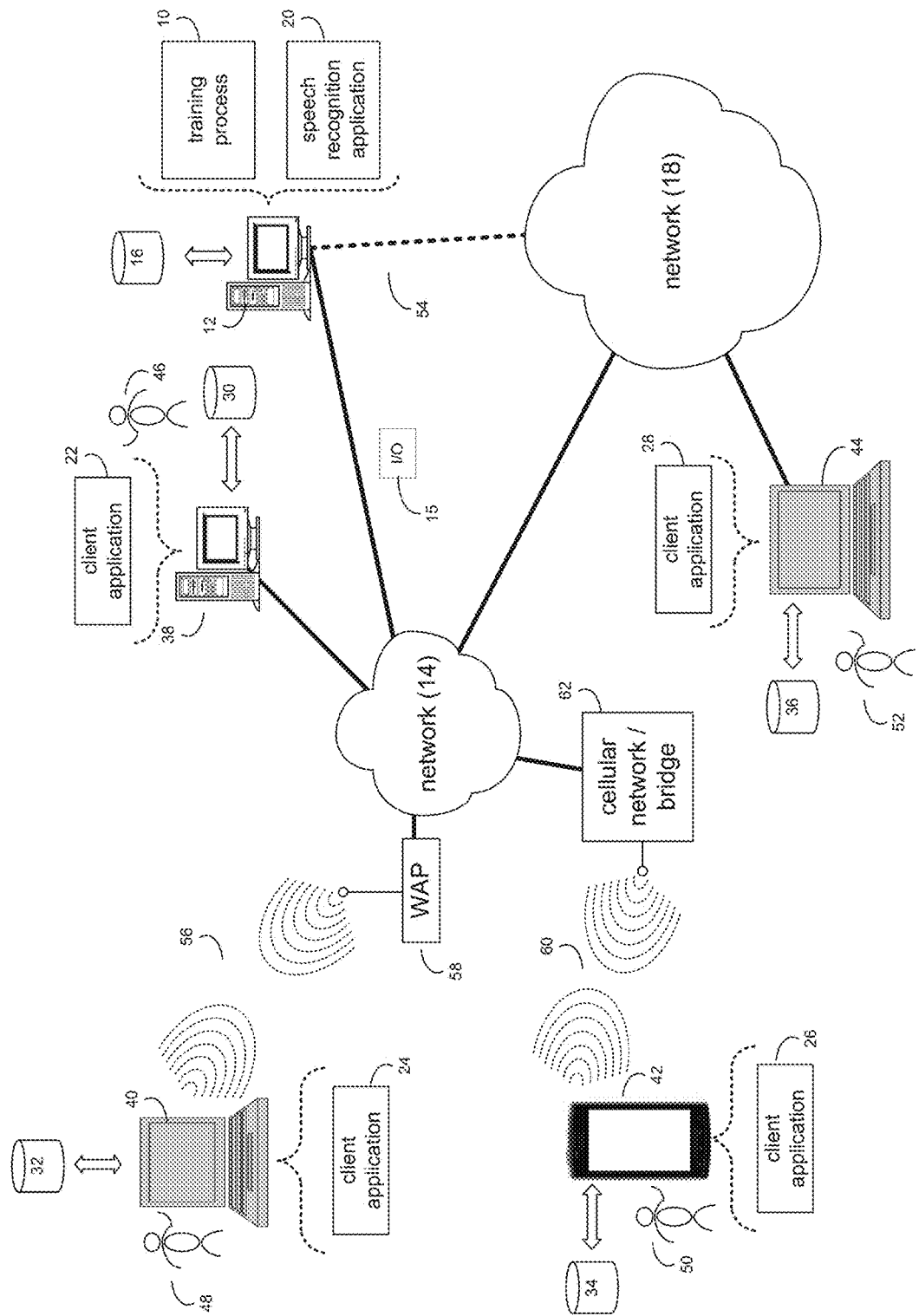
FIG. 1 is an example diagrammatic view of a training process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown training process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a training process, such as training process 10 of FIG. 1, may transform, by a computing device, a speech signal into a speech signal representation. A regression deep neural network may be trained with a cost function to minimize a mean squared error between actual values of the speech signal representation and estimated values of the speech signal representation, wherein the cost function may include one or more discriminative terms. Bandwidth of the speech signal may be extended by extending the speech signal representation of the speech signal using the regression deep neural network trained with the cost function that includes the one or more discriminative terms.

In some implementations, the instruction sets and subroutines of training process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, training process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a speech recognition application (e.g., speech recognition application 20), examples of which may include, but are not limited to, e.g., an automatic speech recognition application, a video conferencing application, a voice-over-IP application, a video-over-IP application, an Instant Messaging (IM)/"chat" application, a short messaging service (SMS)/multimedia messaging service (MMS) application, a telephony network application, a Speech Signal Enhancement (SSE) application, or other application that allows for virtual meeting and/or remote collaboration and/or recognition/translation of spoken language into text (and vice versa) by computing devices. In some implementations, training process 10 and/or speech recognition application 20 may be accessed via one or more of client applications 22, 24, 26, 28. In some implementations, training process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within training process 10, a component of training process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of training process 10 and/or speech recognition application 20. Examples of client applications 22, 24, 26, 28 may include, but are not limited to, e.g., an automatic speech recognition application, a video conferencing application, a voice-over-IP application, a video-over-IP application, an Instant Messaging (IM)/"chat" application, a short messaging service (SMS)/multimedia messaging service (MMS) application, a telephony network application, a Speech Signal Enhancement (SSE) application, or other application that allows for virtual meeting and/or remote collaboration and/or recognition/translation of spoken language into text (and vice versa) by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of training process 10 (and vice versa). Accordingly, in some implementations, training process 10 may be a purely server-side application, a purely client-side application, or a hybrid server-side/client-side application that is cooperatively executed by one or more of client applications 22, 24, 26, 28 and/or training process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, training process 10, and speech recognition application 20, taken singly or in any combination, may effectuate some or all of the same functionality, any description of effectuating such functionality via one or more of client applications 22, 24, 26, 28, training process 10, speech recognition application 20, or combination thereof, and any described interaction(s) between one or more of client applications 22, 24, 26, 28, training process 10, speech recognition application 20, or combination thereof to effectuate such functionality, should be taken as an example only and not to limit the scope of the disclosure.

In some implementations, one or more of users 46, 48, 50, 52 may access computer 12 and training process 10 (e.g., using one or more of client electronic devices 38, 40, 42, 44) directly through network 14 or through secondary network 18. Further, computer 12 may be connected to network 14 through secondary network 18, as illustrated with phantom link line 54. Training process 10 may include one or more user interfaces, such as browsers and textual or graphical user interfaces, through which users 46, 48, 50, 52 may access training process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
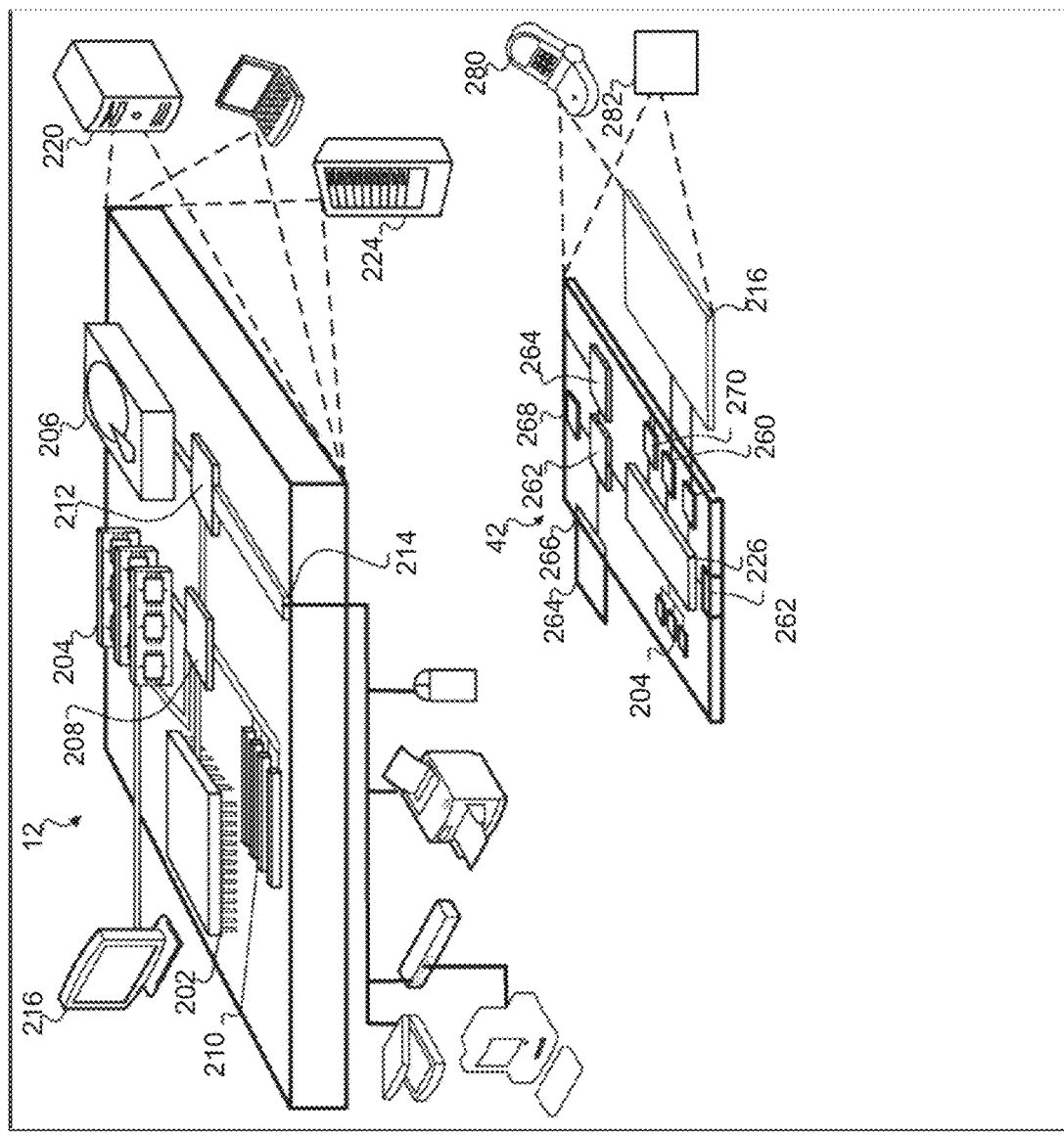
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, training process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

Generally, due to telephony networks, such as Universal Mobile Telecommunications System (UMTS) and Long-Term Evolution (LTE) networks, being expanded into urban areas, users are increasingly more accustomed to high-quality wideband (e.g., 16 kHz) telephony. Coverage tends to be low for locations such as remote highways or rural areas in the countryside. Typically, once the UMTS/LTE connection is lost, the voice quality may be suddenly reduced to narrow-band (e.g., 8 kHz), which may be quite noticeable. Bandwidth extension may be used to bridge the arising voice quality gap by artificially extending the narrow-band (e.g., 8 kHz) telephone signal to a wideband (e.g., 16 kHz), super-wideband (e.g., 24 kHz) or even full-band (e.g., 32/48 kHz) signal.

Generally, artificial bandwidth extension may reconstruct a 16 kHz wide-band signal from a given 8 kHz narrow-band signal. This is typically used in the context of telephony networks and may be achieved by decomposing the speech signal into its excitation and its spectral envelope, both of which may then be extended separately. State-of-the-art approaches typically use deep (regression) neural networks (DNNs) for this task. As a cost function during training, they may use a mean squared error (MSE) between true and estimated wide-band spectra as a cost function for DNN training, plus standard regularization terms such as the L-2 norm of the DNN parameters. This may lead to "over-smoothing", where the network yields a very similar extension for completely different phoneme classes, such as fricatives, which have most of their energy above 4 kHz, and vowels, which have most of their energy below 4 kHz. As a result, the bandwidth-extended speech may be degraded, since vowels may be extended too strongly, and fricatives may not be extended strongly enough. Moreover, high-frequency formants appear to be very different for different speakers, making it difficult (if not impossible) to correctly predict (estimate) them from the original narrow-band envelope.

As will be discussed in greater detail below, the present disclosure may avoid over-smoothing (among other technical problems) while extending narrow-band speech from Global System for Mobile communications (GSM)/Code Division Multiple Access (CDMA) connections (or other connections) to high-quality wideband speech by, e.g., augmenting or adding additional discriminative terms to the cost function (e.g., the MSE cost function) that explicitly force the DNN to maintain a good separability of different phoneme classes (e.g., fricatives and vowels). These terms may increase the cost or "punish" deviations of the average power ratio (APR) between different phoneme classes, which may force the DNN to reproduce the APR of the training data at the output of the DNN. As such, the present disclosure may result in a higher speech quality of the bandwidth-extended signal with more natural bandwidth-extended speech (e.g., due to better separation of fricatives and vowels).

As will be discussed below, training process 10 may at least help, e.g., to overcome an example and non-limiting problem necessarily rooted in and specifically arising in the realm of computer and/or telephone networks to improve existing technological processes associated with, e.g., artificial bandwidth extension and over-smoothing.

Artificial Bandwidth Extension:

As noted above, the general aim of artificial bandwidth extension (BWE) is to improve the voice quality of communication (e.g., phone calls) by extending narrow-band (e.g., 8 kHz bandlimited) speech from, e.g., GSM/CDMA connections to high-quality wideband (e.g., 16 kHz bandwidth) speech (or other data).

Figure 3:
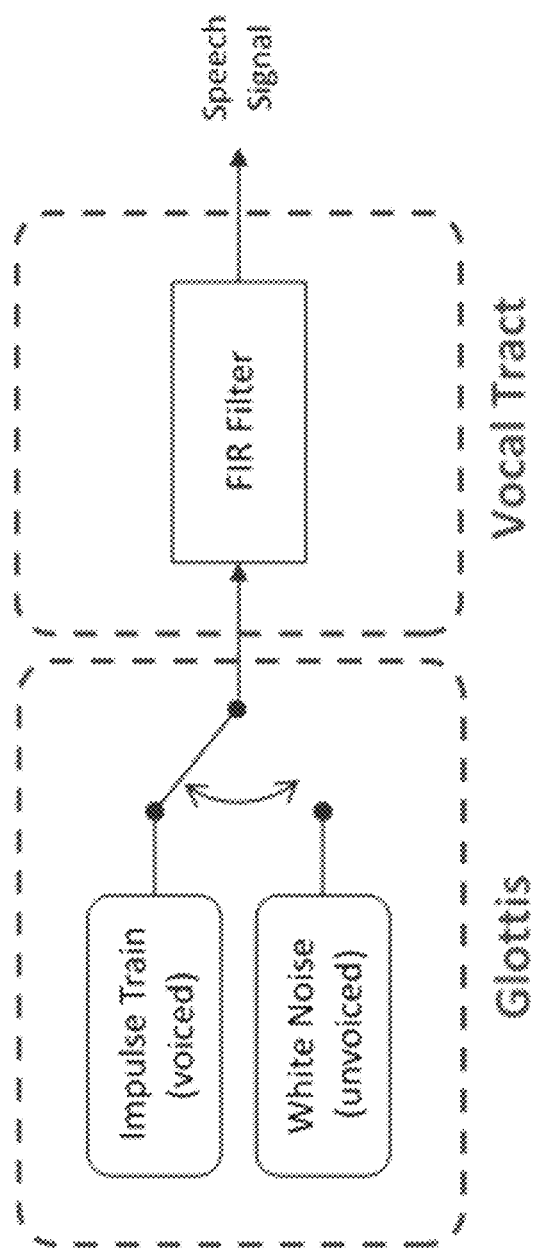
FIG. 3 is an example diagrammatic view of a source/filter model according to one or more example implementations of the disclosure.

For this, BWE systems typically make use of the source/filter model of speech production, such as model 300 shown in example FIG. 3. Training process 10 may use this model to separate speech into a glottal excitation signal and resonance frequencies of the vocal tract.

The glottal excitation signal typically either consists of an "impulse train"-like signal in the case of voiced speech (such as vowels: a, e, i, o, u) or consists of white noise in the case of unvoiced sounds (fricatives, such as f, s, z, sh, ch). The resonance frequencies of the vocal tract may define the spectral envelope, including the formant frequencies that specify in which parts of the spectrum the speech energy is concentrated. They may be modeled as a Finite Impulse Response (FIR) filter that is applied to the glottis excitation signal.

Figure 4:
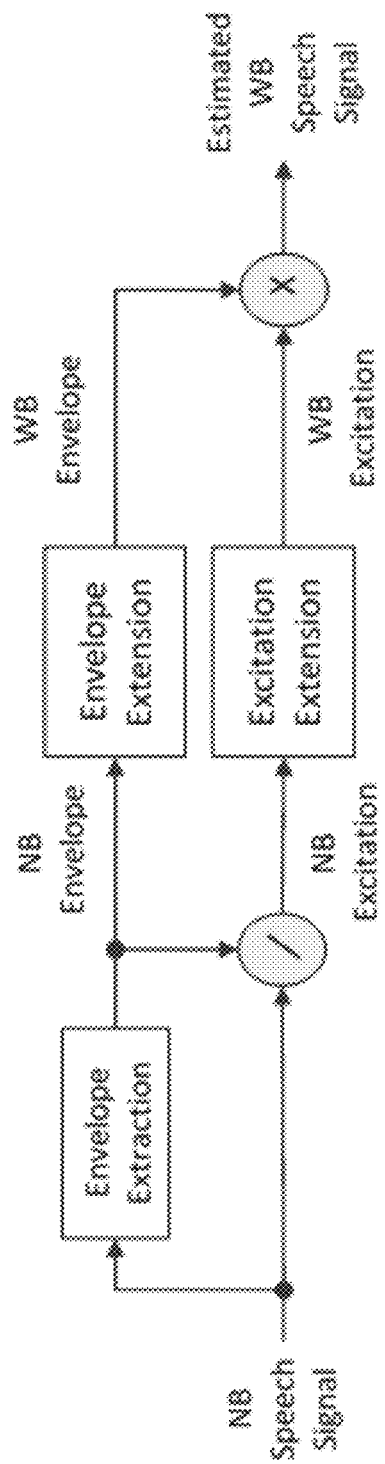
FIG. 4 is an example diagrammatic view of a bandwidth extension architecture according to one or more example implementations of the disclosure.
Figure 5:
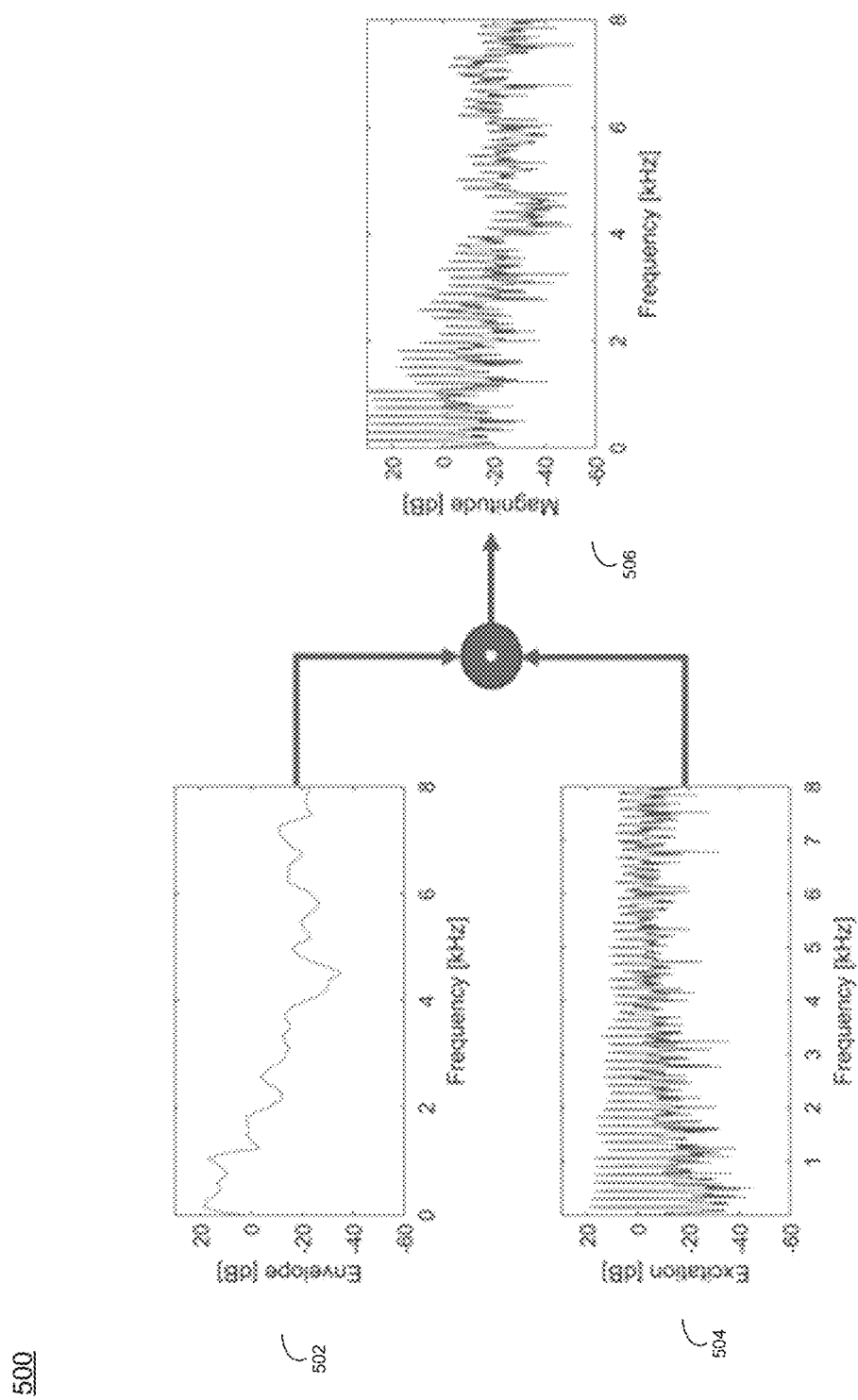
FIG. 5 is an example diagrammatic view of a spectral envelope, an example excitation and the synthesized spectrum according to one or more example implementations of the disclosure.

Motivated by this model, the typical architecture of BWE systems may look like architecture 400 shown in example FIG. 4. After extraction by training process 10 of the spectral envelope of narrow-band (NB) speech using, e.g., Linear Predictive Coding (LPC), the NB excitation signal may be obtained by training process 10 removing the spectral envelope. In the frequency domain, this may be achieved by dividing the NB speech spectrum by the estimated envelope, as indicated in FIG. 4. The envelope and excitation may be extended separately by training process 10. While the excitation may be often extended with methods such as spectral folding (e.g., mirroring the NB excitation upwards to frequencies above 4 kHz) or modulation (e.g., shifting the NB excitation upwards to frequencies above 4 kHz), a lot of effort is put into getting the extension of the spectral envelope correct. This is motivated by the fact that errors in the envelope extension typically result in much stronger artifacts of the bandwidth-extended speech signal than errors in the excitation. In the frequency domain, the estimated, e.g., bandwidth-extended wideband speech spectrum may be obtained by training process 10 multiplying the extended envelope with the extended excitation, as shown FIG. 4. This is again shown in example FIG. 5, depicting example spectrum 500 of a spectral envelope 502, an example excitation 504 and the synthesized spectrum 506. From this, it becomes clear that the envelope describes the spectral coarse structure while the excitation describes the spectral fine structure.

Notably, if bandwidth extension is performed in the frequency domain by training process 10, the incoming narrow-band signal may be cut into overlapping windows, e.g., of 16 to 32 ms duration. These windows may be separately analyzed by Fast Fourier Transform (FFT), e.g., a Short-time Fourier Transform (STFT) may be performed. The bandwidth extended signal may be resynthesized by using an Inverse STFT (ISTFT) in combination with the overlap-and-add method.

Deep Neural Network Based BWE:

State-of-the-art BWE systems typically use deep neural networks (DNNs) for envelope extension. This is generally realized by training (e.g., via training process 10) a regression DNN to estimate wideband envelopes from given narrowband envelopes. In addition to a compressed version of the envelope, e.g. a Mel spectrum or Mel Frequency Cepstral Coefficients (MFCCs), the DNN is often fed with additional input features such as the first and second order derivative of MFCCs with respect to time (called delta and delta-delta features), the spectral centroid, zero-crossing rate, kurtosis, gradient index, noise-related frame energy, correlation coefficients and so on. An overview of a DNN-based BWE system 600 is shown in example FIG. 6.

Figure 6:
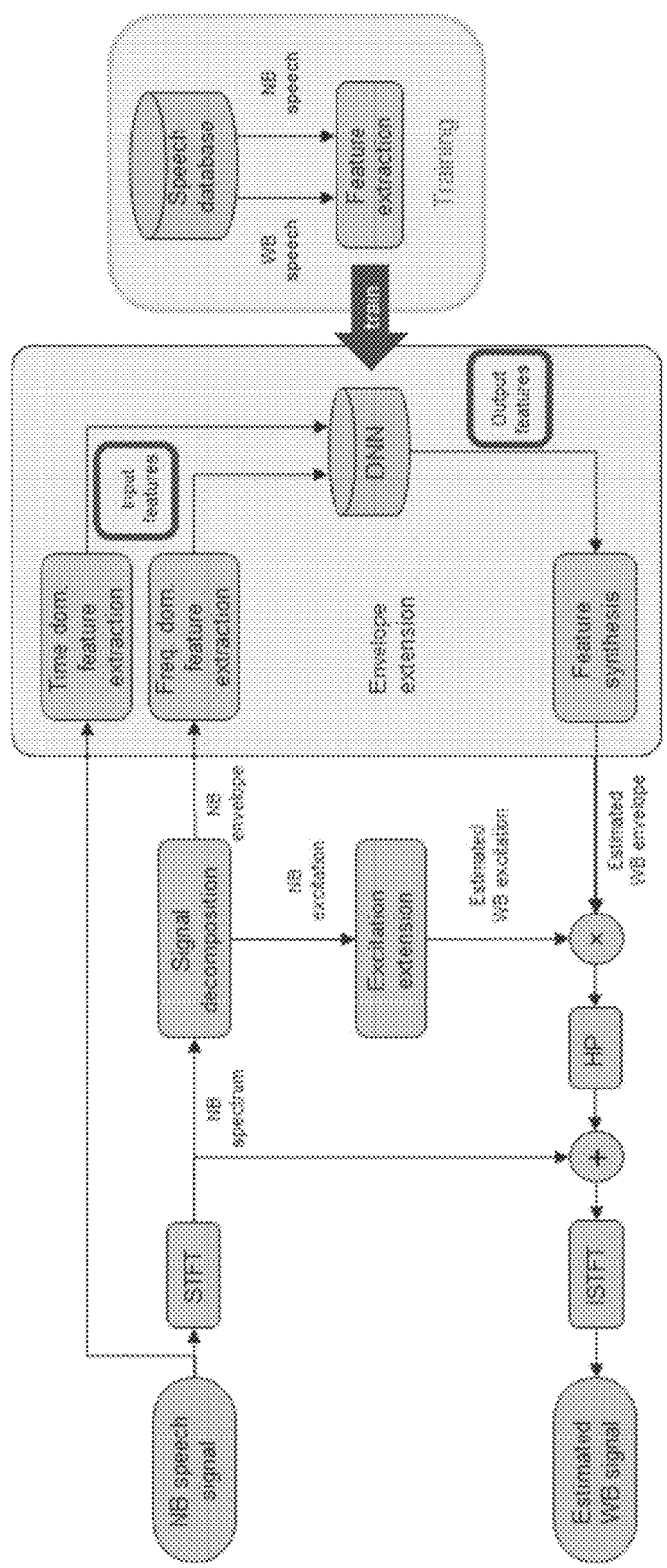
FIG. 6 is an example diagrammatic view of a deep-neural-network-based bandwidth extension system according to one or more example implementations of the disclosure.

As shown in FIG. 6, FD denotes the frequency domain, TD denotes the time domain and HP denotes a high pass filter with a cut-off frequency of, e.g., 4 kHz, such that the original 4 kHz of the NB signal is preserved and only the signal above 4 kHz is extended. Alternative implementations by training process 10 may perform the signal decomposition in the time domain using the LPC coefficients as a spectral envelope and the LPC residual as an excitation signal.

Figure 7:
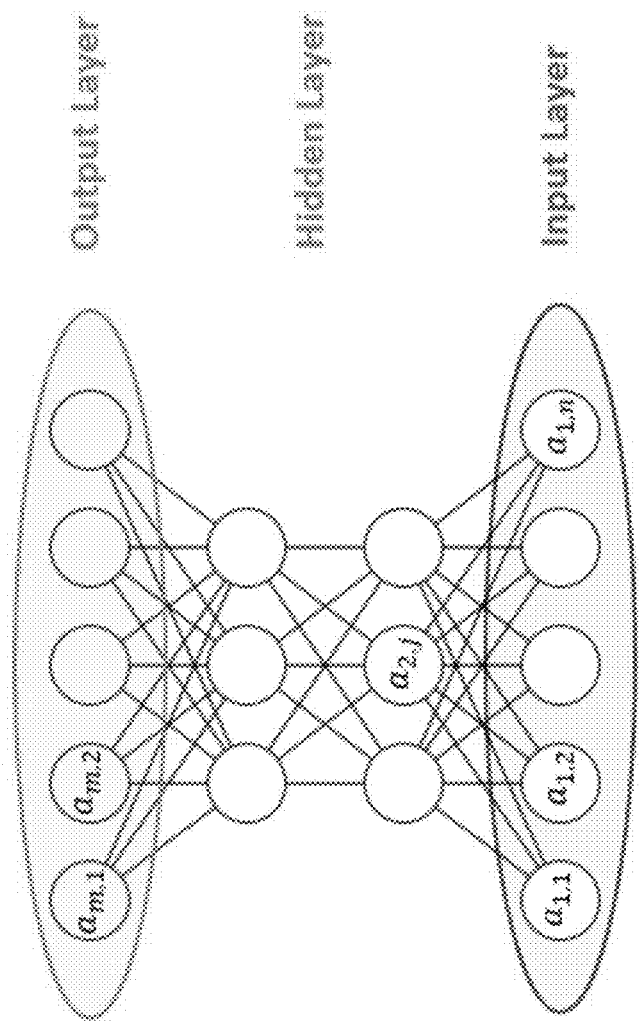
FIG. 7 is an example diagrammatic view of a feedforward neural network according to one or more example implementations of the disclosure.

In the DNN, the input features may be represented to the network in the nodes (e.g., nodes 700) of the input layer, shown in example FIG. 7. This may be followed by several hidden layers. The output of the network may be contained in the nodes of the output layer and may consist of the estimated wideband spectrum, possibly in a compressed form such as a Mel spectrum or MFCCs.

Figure 8:
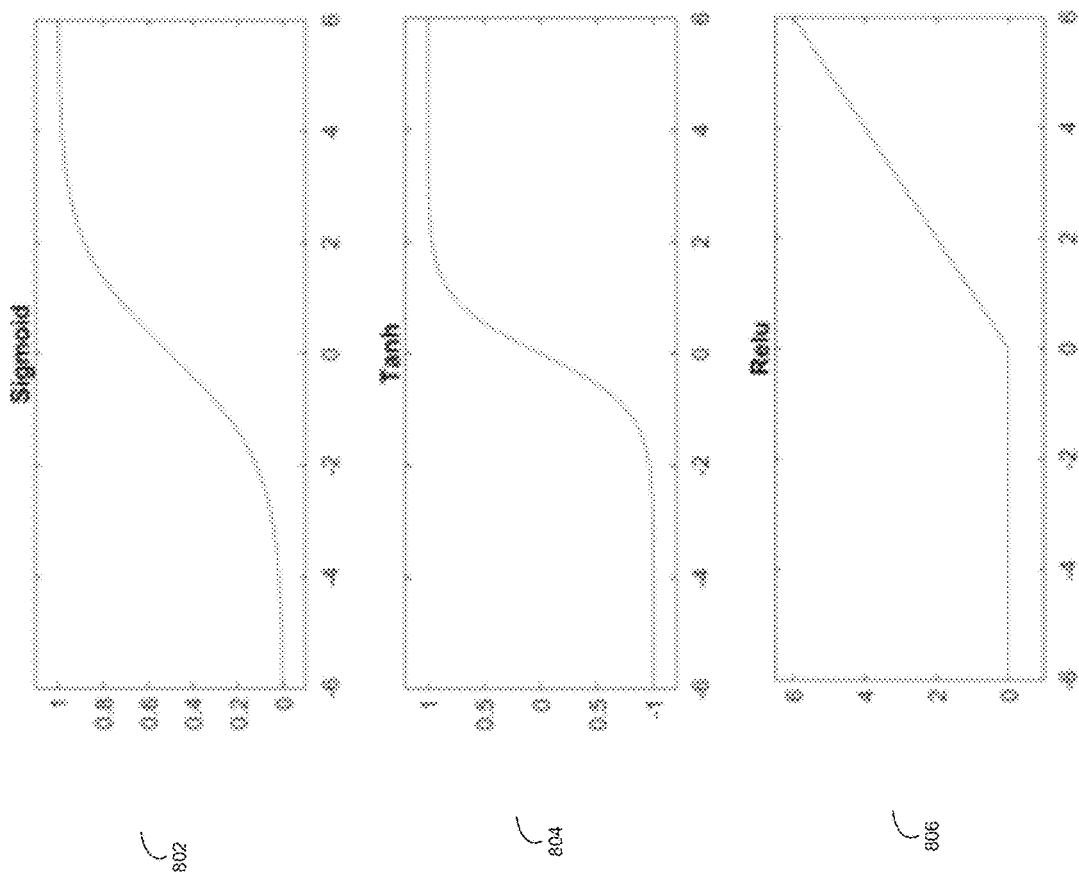
FIG. 8 is an example diagrammatic view of non-linear activation functions according to one or more example implementations of the disclosure.

Within the network, the activations $a_{i+1}=[a_{i+1,1}, \ldots, a_{i+1,n}]^T$ of the nodes of the (i+1)-st layer may be determined from the activations $a_i$ of the preceding layer. This may be accomplished according to, e.g.:

$$a_{i+1}=act(W_i a_i + b_i)$$

where $W_i$ is a weight matrix, $b_i$ is a vector of biases and act is a non-linear activation function, such as a sigmoid 802, hyperbolic tangent (tanh) 804 or a rectified linear unit (Relu) 806 shown in example FIG. 8.

Figure 9:
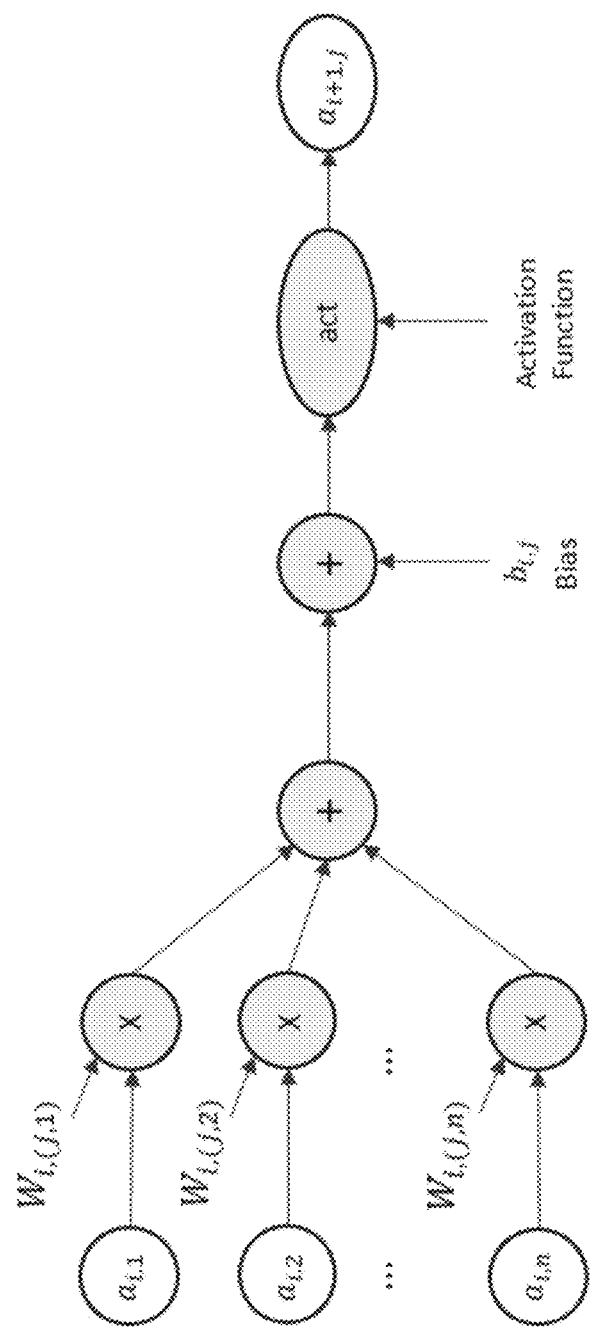
FIG. 9 is an example diagrammatic view of the calculation of activation energies in feedforward neural networks according to one or more example implementations of the disclosure.

FIG. 9 shows an example architecture 900 that again portrays how a particular activation $a_{i+1,j}$ may be determined from the activation vector $a_i$ of the preceding layer. For bandwidth extension, the DNN training may be performed by training process 10 on a joint corpus of narrow-band and wideband speech. The narrow-band signal may be used by training process 10 for extracting the input features of the DNN. The corresponding wideband signal may be used by training process 10 for generating the target for the output layer of the DNN, e.g., the wideband spectral envelopes that the DNN should generate for the given input.

Cost Function During Training:

Training a DNN may use a cost function, e.g., a measure between the desired target outputs and the outputs generated by the network, which is to be minimized during training by training process 10. For the regression DNNs used in bandwidth extension, this is typically the mean squared error (MSE) between true and estimated wide-band spectral envelopes (or a compressed versions thereof), plus standard regularization terms such as the L-2 norm of the DNN weights, e.g.:

$$C(y, \hat{y}, W) = \underbrace{\sum_{i=1}^{N} \|y_t - \hat{y}_t\|^2}_{C_{MSE}(y,\hat{y},)} + \underbrace{\beta \cdot \frac{1}{2}\|W\|_2^2}_{C_{Reg}(W)}$$

where $y_i$ denotes the true wideband spectral envelopes or a compressed version thereof at time t, $\hat{y}_i$ denotes the corresponding estimated wideband spectrum which the DNN generates at the output layer and N denotes the size of the batch or mini-batch used in the training. The regularization term, e.g., $$C_{Reg}(W) = 1/2\|W\|_2^2$$

is the L-2 norm over all weights matrices $W=\{W_1, W_2, \ldots\}$. It may be added to the cost function, e.g., in order to prevent too large weights in the training process. This is generally considered to improve the generalizability, e.g., the robustness of the trained network to unseen conditions and is part of standard training recipes.

The actual training process of the DNN may be essentially a gradient descent algorithm. It may consist in first calculating the gradient of the cost function with respect to the weights $W_{i(j,k)}$ and biases $b_{i,j}$ on the entire batch or mini-batch, and then taking a step into the opposite direction in order to reduce the cost, e.g.:

$$W_{i,(j,k)} \leftarrow W_{i,(j,k)} - \mu \cdot \frac{\partial C(y, \hat{y}, W)}{\partial W_{i,(j,k)}}$$

$$b_{i,j} \leftarrow b_{i,j} - \mu \cdot \frac{\partial C(y, \hat{y}, W)}{\partial b_{i,j}}$$

A typical batch size may contain, e.g., a few seconds of speech data. The term µ denotes the step size. It has a major effect on the convergence speed and the performance of the trained network, and it may be determined automatically in modern DNN training toolkits, using, e.g., Adaptive Moment Estimation (ADAM). The gradient calculation may be accomplished with a back propagation method and it, in particular, may involve the calculation of the gradient of $C(y, \hat{y}, W)$ with respect to the network outputs $\hat{y}_{i,j}$, e.g., the activations at the output layer of the network for a given input feature $x_i$, e.g.:

$$\frac{\partial C(y, \hat{y}, W)}{\partial \hat{y}_{t,j}} = \frac{\|y_i - \hat{y}_t\|^2}{\partial \hat{y}_{t,j}}$$

The gradient descent may be repeated until a specified stopping criterion has been fulfilled, such as no significant reduction of the cost $C(y, \hat{y}, W)$ in the last M iterations on a validation data set that differs from the training data set.

Figure 10:
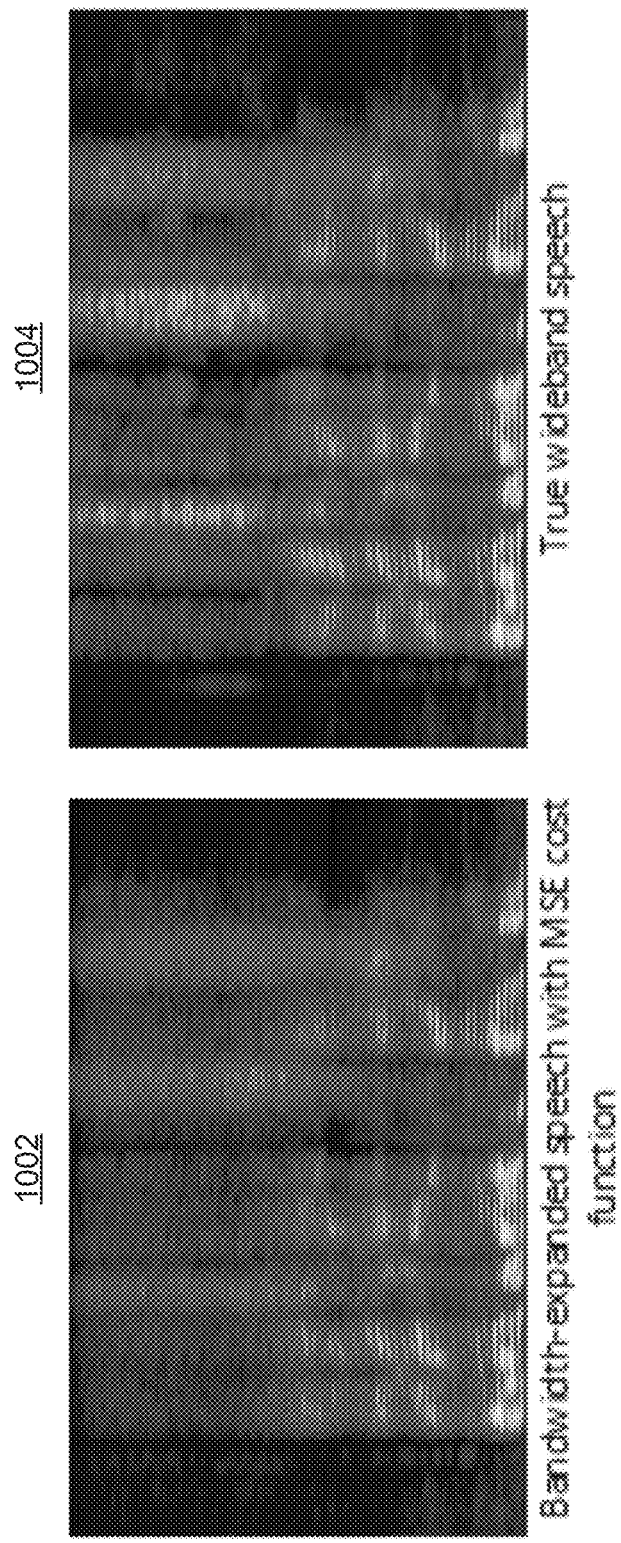
FIG. 10 is an example diagrammatic view of a bandwidth-extended speech spectrogram with MSE cost function and a true wideband speech spectrogram according to one or more example implementations of the disclosure.

Over-Smoothing:

Using the MSE as a cost function may result in over-smoothing (e.g., vowels and fricatives are extended in a similar fashion). In particular, fricatives are not generally extended strongly enough while vowels are extended too strongly, as shown in Bandwidth-expanded speech with MSE cost function 1002 and True wideband speech 1004 of example FIG. 10. This in particular may happen for data that differs from the training conditions, but it may also be observed on the training data, at least to some extent. It may also be possible to measure this phenomenon quantitatively, by using the standard deviation of the power above, e.g., 4 kHz from the mean of the power above, e.g., 4 kHz, e.g.:

$$\sigma(y) = \sqrt{\sum_{t=1}^{N}\left(\lceil y_t \rceil^2 - \sum_{t=1}^{N}\lceil y_t \rceil^2\right)^2}$$

where $\lceil y_i \rceil^2$ denotes the power that the spectrum $y_i$ exhibits between 4 kHz and the Nyquist frequency, e.g.:

$$\lceil y_i \rceil^2 = \Sigma_{j=A}^{B}|y_i|^2$$

with A denoting the frequency bin corresponding to, e.g., 4 kHz and B denoting the frequency bin corresponding to the Nyquist frequency, e.g., 8 kHz for a wideband signal.

Figure 11:
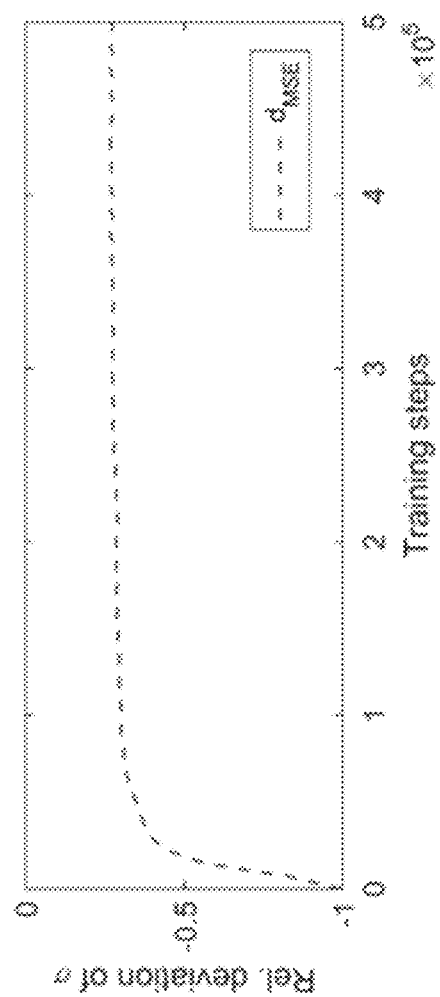
FIG. 11 is an example diagrammatic view of a plot according to one or more example implementations of the disclosure.

As can be seen from plot 1100 of example FIG. 11, there is shown the relative deviation $$\frac{\sigma(\hat{y}) - \sigma(y)}{\sigma(y)}$$

between the standard deviation of the wideband extension $\sigma(\hat{y})$ and the standard deviation of the true wideband $\sigma(y)$ throughout the iterations of the training process. When the MSE is used as a cost function ($d_{MSE}$) there is clearly a bias of −0.26 after convergence of the training (in this particular example). This may correspond to a relative underestimation of $\sigma(y)$ by, e.g., 26%. Additionally, this is another clear indicator that strong fricatives (such as "z" and "s"), which exhibit a lot of energy above, e.g., 4 kHz, are not sufficiently separated from vowels (such as "o" and "u"), which do not have much energy above, e.g., 4 kHz, which is another clear indicator for over-smoothing.

Figure 12:
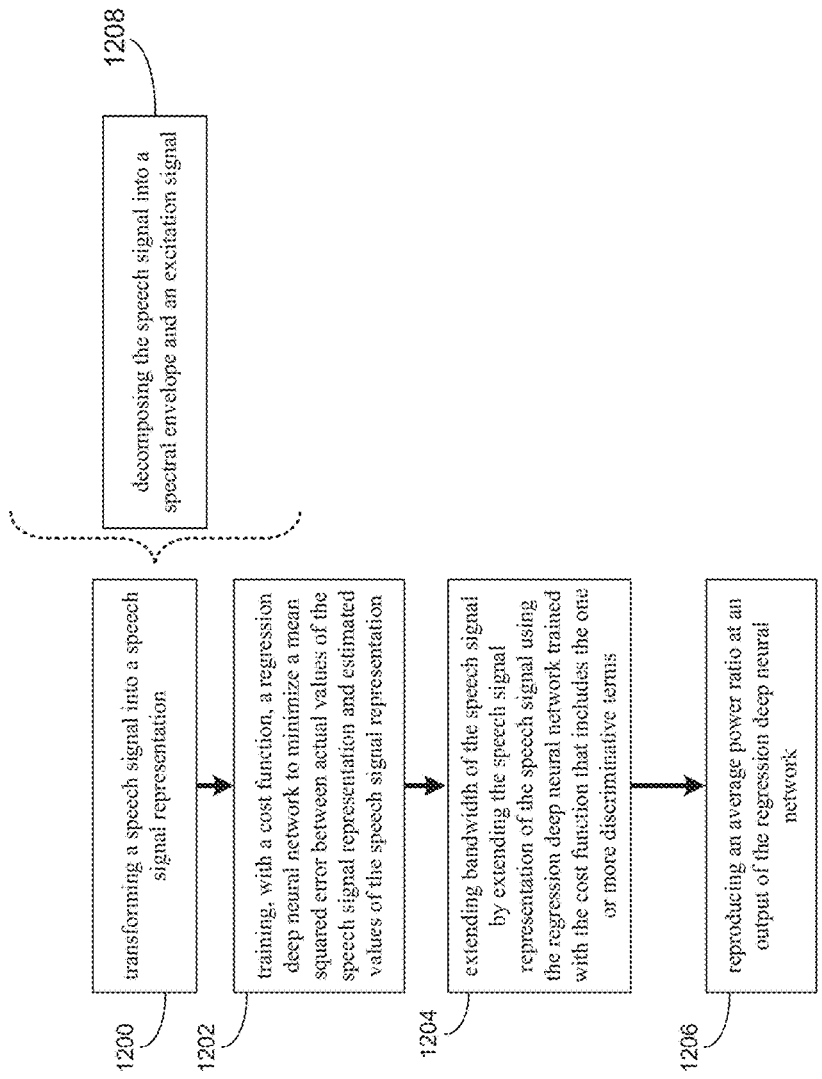
FIG. 12 is an example flowchart of a training process according to one or more example implementations of the disclosure.
Figure 13:
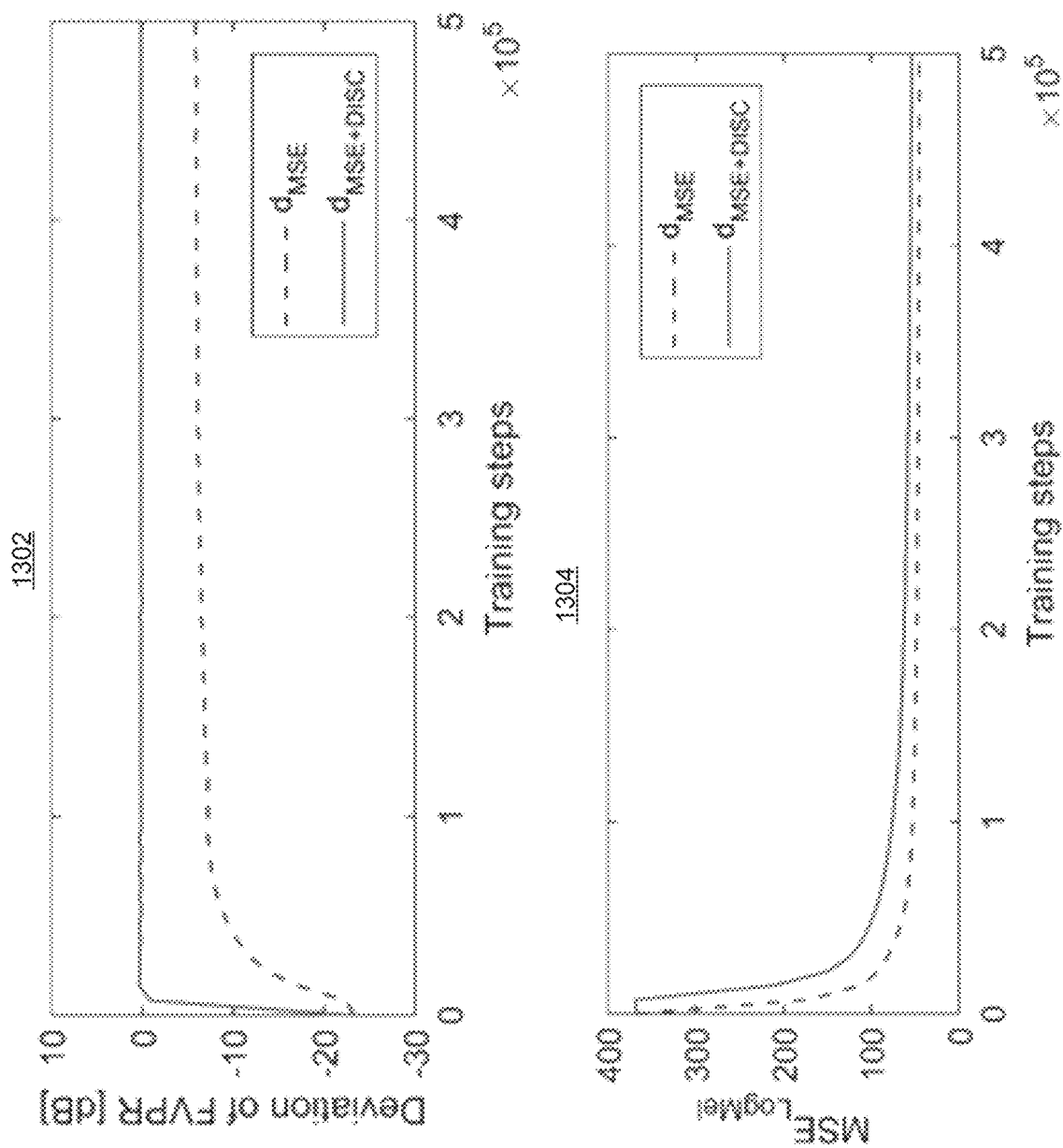
FIG. 13 is an example diagrammatic view of plots according to one or more example implementations of the disclosure.

The Training Process:

As discussed above and referring also at least to the example implementations of FIGS. 12-13, training process 10 may transform 1200, by a computing device, a speech signal into a speech signal representation. Training process 10 may train 1202 a regression deep neural network with a cost function to minimize a mean squared error between actual values of the speech signal representation and estimated values of the speech signal representation, wherein the cost function may include one or more discriminative terms. Training process 10 may extend 1204 the bandwidth of the speech signal by extending the speech signal representation of the speech signal using the regression deep neural network trained with the cost function that includes the one or more discriminative terms.

As noted above, training process 10 may receive a speech signal, and transform 1200 the speech signal into a speech signal representation. In some implementations, the speech signal representation may be obtained by training process 10 decomposing 1208 the speech signal into a spectral envelope and an excitation signal, and wherein the spectral envelope may be extended using the regression deep neural network trained with the cost function. It will be appreciated that decomposing 1208 the speech signal may not be necessary (e.g., by directly estimating the entire complex wideband spectrum with a much larger DNN or convolutional neural network (CNN)).

In some implementations, training process 10 may train 1202 a regression deep neural network with a cost function to minimize a mean squared error between actual values of the speech signal representation and estimated values of the speech signal representation, as well as extend 1204 bandwidth of the speech signal. However, training process 10 may overcome the above-noted over-smoothing problem by, e.g., improving the separation of different phoneme classes. This may be achieved by training process 10 adding one or more discriminative terms to the cost function in order to preserve differences between different phoneme classes, which may be most generally be formulated as, e.g.:

$$C(y,\hat{y},W,L) = C_{MSE}(y,\hat{y}) + \beta \cdot C_{Reg}(W) + \gamma \cdot C_{DISC}(y,\hat{y},L)$$

where $L = \{l_1, \ldots, l_N\}$ denotes phoneme class labels corresponding to the spectra $y = \{y_1, \ldots, y_N\}$ of the batch. More particularly, the labels may identify to which phoneme or phoneme class the spectra belong. The weight $\gamma$ may be used by training process 10 to trade-off the discriminative measure $C_{DISC}$ versus the MSE, as well as the regression term.

In some implementations, the one or more discriminative terms may preserve relations of statistics between different phoneme classes in the actual values of the speech signal representation and the estimated values of the speech signal representation. For example, the discriminative term $C_{DISC}(y, \hat{y}, L)$ aims at preserving the differences between phoneme classes by explicitly punishing (e.g., increasing the cost for) deviations in the statistics between different phoneme classes. As noted above, the different phoneme classes may include a fricative phoneme class and/or a vowel phoneme class. It will be appreciated that other phoneme classes may also be used with the present disclosure. The discriminative term(s) may include at least one of a fricative-to-vowel power ratio and a function thereof, and in some implementations, the relative statistic to be preserved by training process 10 may be the average high-band power ratio between fricatives and vowels (FVPR), e.g.:

$$FVPR(y, L) := 10 \cdot \log_{10}\left(\frac{\sum_{t=1}^{N} \delta_{l_t=fric} \cdot \lceil y_t \rceil^2 / \sum_{t=1}^{N} \delta_{l_t=fric}}{\sum_{t=1}^{N} \delta_{l_t=vow} \cdot \lceil y_t \rceil^2 / \sum_{t=1}^{N} \delta_{l_t=vow}}\right)$$

where is $\delta_{l_t=fric}$ is a fricative, 0 otherwise, and where $\delta_{l_t=vow}$ is 1 if $l_t$ is a vowel, 0 otherwise. The term $\lceil y_t \rceil^2$ denotes the power that $y_t$ exhibits in the upper part of the spectrum (e.g., above 4 kHz), e.g., the part into which the narrow-band input signal is extended 1204. In some implementations, different phoneme classes may be separated through their power. For example, training process 10 may use power ratios in different frequency bands of the spectrum, e.g., fricative-to-vowel power ratio calculated on the 4 frequency bands 4-5 kHz, 5-6 kHz, 6-7 kHz, 7-8 kHz, instead of using the broad band power ratio calculated from 4 to 8 kHz (as discussed throughout). In some implementations, adding a term to the cost function that forces the DNN to match the variance or standard deviation of the true and estimated speech signal representations (discussed above) may also help with training a more discriminative network. However, a network trained with this term may tend to produce more artifacts than explicitly separating phoneme classes. In some implementations, if MFCCs or logarithmic Mel spectra are used as output features of the DNN, the output features may need to be brought to the power spectral domain by training process 10 before calculating the discriminative measure. In case of MFCCs, this may be achieved by, e.g., training process 10 multiplying the y, with the pseudo-inverse of the Discrete Cosine Transform (DCT) and then taking the inverse of $10 \cdot \log_{10}$. For logarithmic Mel spectra, training process 10 may take the inverse of $10 \cdot \log_{10}$.

In order to "punish" deviations of the DNN's FVPR (e.g., the FVPR of the wideband spectra predicted by the DNN) from the FVPR of true wideband speech, the MSE between $FVPR(\hat{y}, L)$ and $FVPR(y, L)$ may be used as a discriminative measure, e.g.:

$$C_{DISC}(y,\hat{y},L) = |FVPR(\hat{y},L) - FVPR(y,L)|^2$$

as could be any other distance metric that punishes deviations.

In some implementations, training process 10 may reproduce 1206 an average power ratio at an output of the regression deep neural network. For example, in some implementations, training process 10 adding this measure to the cost function may result in a joint optimization of the MSE and the discriminative term. If the weighty is chosen appropriately, the network may be forced to approximately reproduce the true FVPR (at the output of the regression DNN) in addition to minimizing the mean squared error. This may be seen in the example plots 1302 and 1304 of example FIG. 13, which show the convergence throughout the training process of both $FVPR(\hat{y},L) - FVPR(y, L)$ as well as the MSE of the logarithmic Mel spectrum (e.g., power spectrum in Mel scale measure in dB). The dashed curves show the cost measures for plain MSE training with regularization. The solid curves show the corresponding cost measures with the additional discriminative term.

As can be seen from the plots, the dashed curve clearly shows that minimizing the MSE does not necessarily naturally minimize the distance between the FVPR of the DNN and that of true wideband speech. In particular, there may be shown a bias and the power ratio may be systematically under-estimated. Training process 10 using the additional discriminative term preserves the FVPR (distance close to zero) but the MSE may converge to almost the same value as for plain MSE training. Consequently, the estimated wideband envelopes of fricatives and vowels may be better separated as well as the true wideband envelopes of the training data set.

This separation may be further emphasized by training process 10 overestimating the FVPR of true wideband speech with an overestimation factor of $\alpha$, e.g.:

$$C_{DISC}(y,\hat{y},L) = |FVPR(\hat{y},L) - \alpha \cdot FVPR(y,L)|^2$$

In some implementations, the cost function may preserve a power ratio between the different phoneme classes in the actual values of the speech signal representation and the estimated values of the speech signal representation, and in some implementations, the cost function may preserve the power ratio between the different phoneme classes using a weighted sum of K power ratio errors between the different phoneme classes. For example, training process 10 may generalize this to multiple phoneme classes, by, e.g., extending the distance measure to a weighted sum of K power ratio errors between different classes, e.g.:

$$C_{DISC}(y, \hat{y}, L) = \sum_{k=1}^{N} c_k \cdot |PR_k(\hat{y}, L) - \alpha_k \cdot PR_k(y, L)|^2$$

where the $c_k$ are weights, the k-th power ratio $PR_k(y, L)$ is defined as, e.g.:

$$PR_k(y, L) := 10 \cdot \log_{10}\left(\frac{\sum_{t=1}^{N} \delta_{l_t=class_1(k)} \cdot \lceil y_t \rceil^2 / \sum_{t=1}^{N} \delta_{l_t=class_1(k)}}{\sum_{t=1}^{N} \delta_{l_t=class_2(k)} \cdot \lceil y_t \rceil^2 / \sum_{t=1}^{N} \delta_{l_t=class_2(k)}}\right)$$

and $class_1(k)$ and $class_2(k)$ denote the phoneme classes that are compared in the k-th ratio. The $\alpha_k$ are overestimation factors for the power ratios of the true wideband signals.

In general, $C_{DISC}(y, \hat{y}, L)$ may be any distance metric between statistics that relate different phoneme classes.

In some implementations, training process 10 may use the present disclosure to learn to predict a value or a vector of values (similar to statistical regression). This contrasts with classification DNNs, which typically only learn class affiliations of the input feature vector (e.g., phoneme classes in the context of speech recognition).

The terminology used herein is for the purpose of describing particular implementations only and is not intended to be limiting the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   transforming, by a computing device, a speech signal into a speech signal representation;
   training, with a cost function, a regression deep neural network to minimize a mean squared error between actual values of the speech signal representation and estimated values of the speech signal representation, wherein the cost function includes one or more discriminative terms; and
   extending bandwidth of the speech signal by extending the speech signal representation of the speech signal using the regression deep neural network trained with the cost function that includes the one or more discriminative terms;
   wherein at least one of: (i) the one or more discriminative terms include at least one of a fricative-to-vowel power ratio and a function thereof; (ii) the one or more discriminative terms preserve relations of statistics between different phoneme classes in the actual values of the speech signal representation and the estimated values of the speech signal representation; and (iii) the method further comprising reproducing an average power ratio at an output of the regression deep neural network.

2. The computer-implemented method of claim 1 wherein the speech signal representation is obtained by decomposing the speech signal into a spectral envelope and an excitation signal, and wherein the spectral envelope is extended using the regression deep neural network trained with the cost function.

3. The computer-implemented method of claim 1 wherein the cost function preserves a power ratio between the different phoneme classes in the actual values of the speech signal representation and the estimated values of the speech signal representation.

4. The computer-implemented method of claim 1 wherein the cost function preserves the power ratio between the different phoneme classes using a weighted sum of K power ratio errors between the different phoneme classes.

5. A computer program product residing on a non-transitory computer readable storage medium having a plurality of instructions stored thereon which, when executed across one or more processors, causes at least a portion of the one or more processors to perform operations comprising:
   transforming a speech signal into a speech signal representation;
   training, with a cost function, a regression deep neural network to minimize a mean squared error between actual values of the speech signal representation and estimated values of the speech signal representation, wherein the cost function includes one or more discriminative terms; and
   extending bandwidth of the speech signal by extending the speech signal representation of the speech signal using the regression deep neural network trained with the cost function that includes the one or more discriminative terms;
   wherein at least one of: (i) the one or more discriminative terms include at least one of a fricative-to-vowel power ratio and a function thereof; (ii) the one or more discriminative terms preserve relations of statistics between different phoneme classes in the actual values of the speech signal representation and the estimated values of the speech signal representation; and (iii) the operations further comprising reproducing an average power ratio at an output of the regression deep neural network.

6. The computer program product of claim 5 wherein the speech signal representation is obtained by decomposing the speech signal into a spectral envelope and an excitation signal, and wherein the spectral envelope is extended using the regression deep neural network trained with the cost function.

7. The computer program product of claim 5 wherein the cost function preserves a power ratio between the different phoneme classes in the actual values of the speech signal representation and the estimated values of the speech signal representation.

8. The computer program product of claim 5 wherein the cost function preserves the power ratio between the different phoneme classes using a weighted sum of K power ratio errors between the different phoneme classes.

9. A computing system including one or more processors and one or more memories configured to perform operations comprising:
   transforming a speech signal into a speech signal representation;
   training, with a cost function, a regression deep neural network to minimize a mean squared error between actual values of the speech signal representation and estimated values of the speech signal representation, wherein the cost function includes one or more discriminative terms; and
   extending bandwidth of the speech signal by extending the speech signal representation of the speech signal using the regression deep neural network trained with the cost function that includes the one or more discriminative terms;
   wherein at least one of: (i) the one or more discriminative terms include at least one of a fricative-to-vowel power ratio and a function thereof; (ii) the one or more discriminative terms preserve relations of statistics between different phoneme classes in the actual values of the speech signal representation and the estimated values of the speech signal representation; and (iii) the operations further comprising reproducing an average power ratio at an output of the regression deep neural network.

10. The computing system of claim 9 wherein the speech signal representation is obtained by decomposing the speech signal into a spectral envelope and an excitation signal, and wherein the spectral envelope is extended using the regression deep neural network trained with the cost function.

11. The computing system of claim 9 wherein the cost function preserves a power ratio between the different phoneme classes in the actual values of the speech signal representation and the estimated values of the speech signal representation, and wherein the cost function preserves the power ratio between the different phoneme classes using a weighted sum of K power ratio errors between the different phoneme classes.

* * * * *